H. F. PARKER.
BALANCING MEANS FOR AEROPLANES.
APPLICATION FILED OCT. 15, 1910.
1,010,946.
Patented Dec. 5, 1911.
2 SHEETS—SHEET 1.
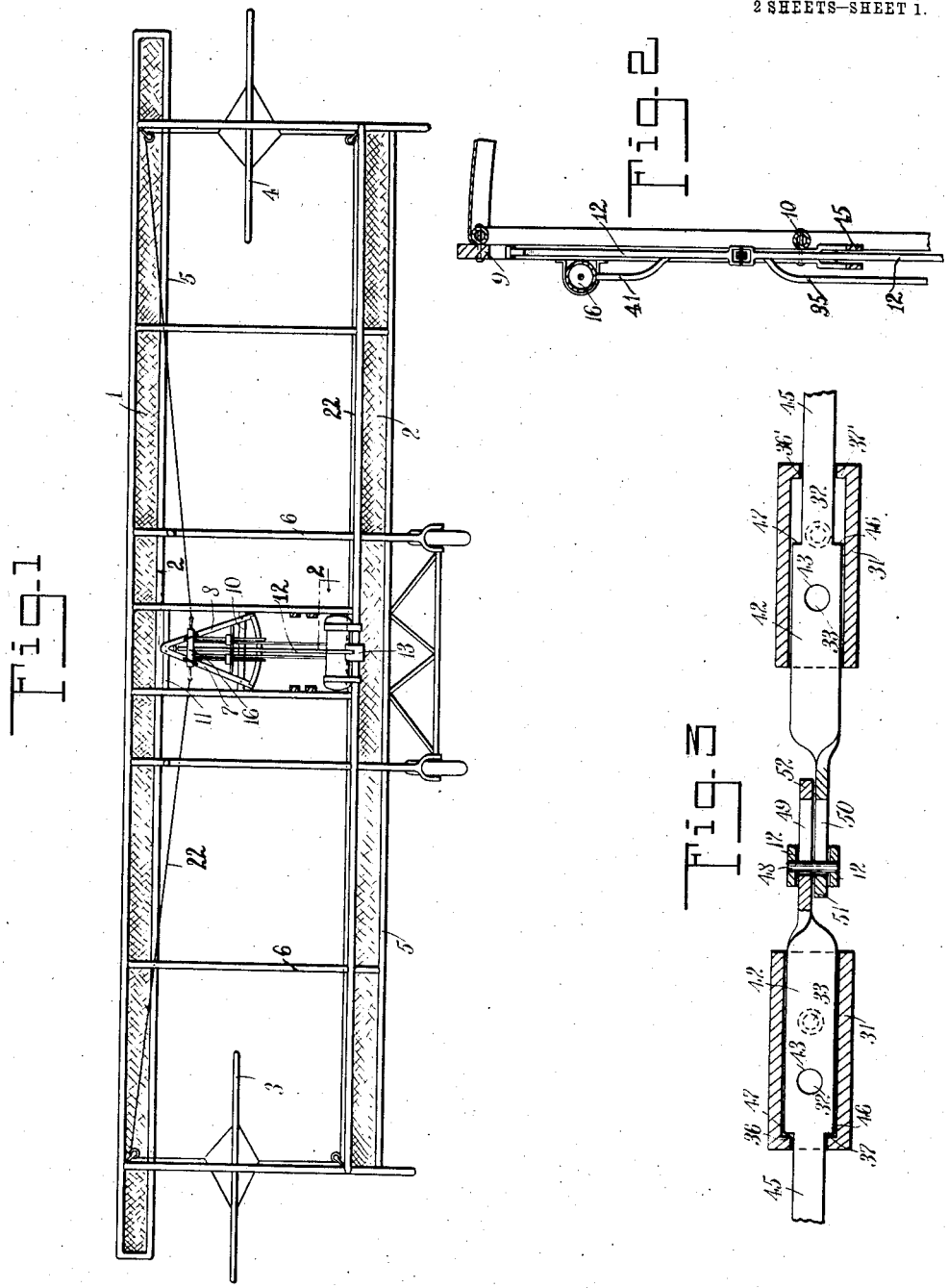
WITNESSES:
INVENTOR
Harold F Parker
BY
ATTORNEYS

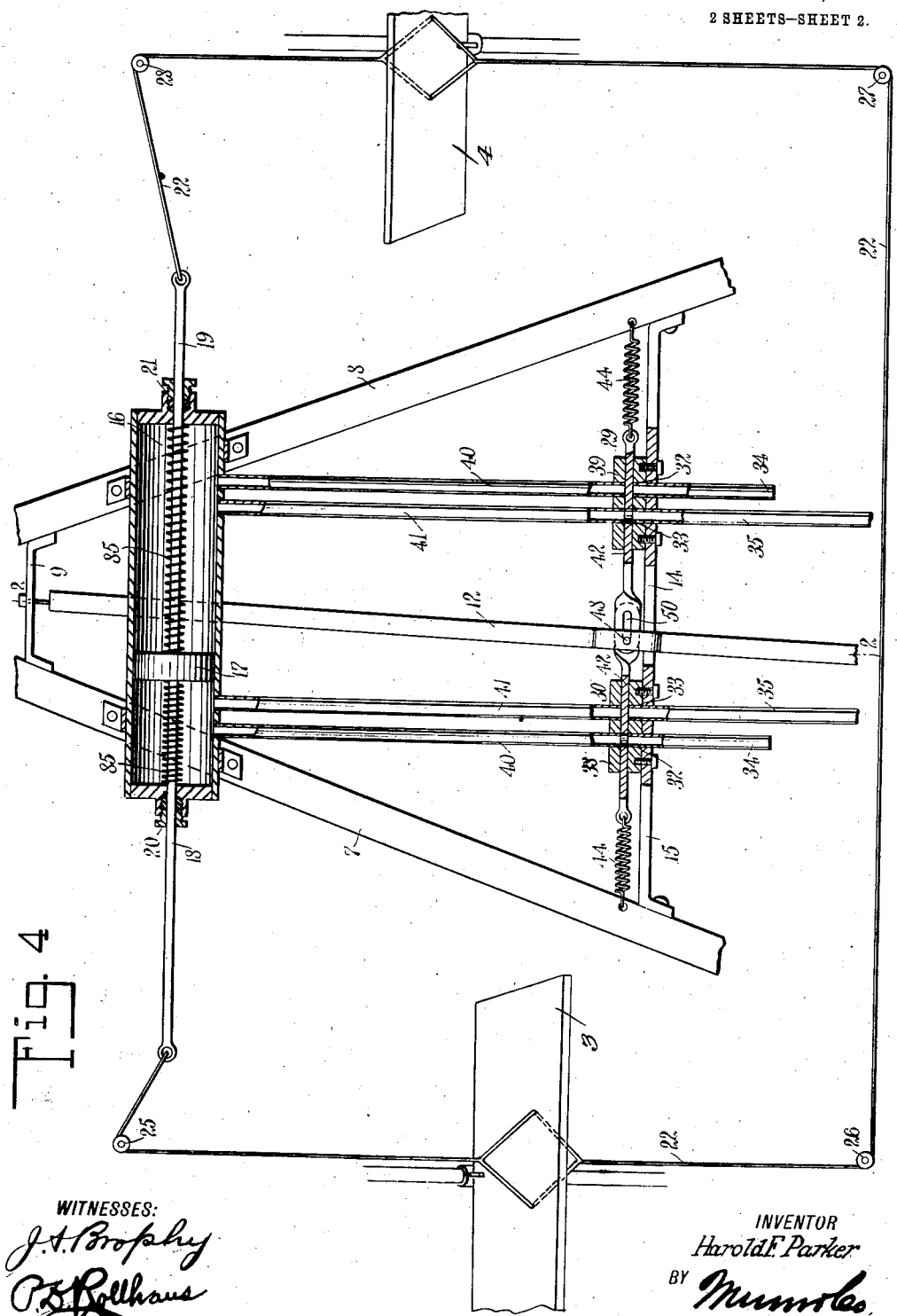

UNITED STATES PATENT OFFICE.

HAROLD FOSTER PARKER, OF DORCHESTER CENTER, MASSACHUSETTS.

BALANCING MEANS FOR AEROPLANES.

1,010,946.  Specification of Letters Patent.  Patented Dec. 5, 1911.

Application filed October 15, 1910. Serial No. 587,211.

*To all whom it may concern:*

Be it known that I, HAROLD F. PARKER, a citizen of the United States, and a resident of Dorchester Center, in the county of Suffolk and State of Massachusetts, have invented a new and useful Balancing Means for Aeroplanes, of which the following is a full, clear, and exact description.

My invention relates generally to aeroplanes, and more particularly is directed to an improved balancing means whereby the machine may at all times retain its horizontal position, the same means being operable by the aviator to effect changes in the direction of flight of the machine when in the air.

The object of the invention is to provide means of the class described which may be attached to any aeroplane in order to effect the result hereinbefore set forth.

A further object of the invention is to provide a simple and efficient device for balancing an aeroplane, as well as for steering purposes, which shall be efficient in operation and consist of few parts, thereby lessening the chances of accident resulting from inoperativeness or complexity of the parts.

My device comprises a swinging pendulum which is operatively connected to two valves, one on each side thereof. An air cylinder is located adjacent the top of the frame of the machine and central thereof, and a supply of air is provided, which, by the operation of the pendulum controlled valves, may be admitted to either side of a piston in the air cylinder, whereby the machine is balanced, due to the control of the pivoted balancing planes by this piston.

In the accompanying sheets of drawings, I have set forth the preferred form of my invention.

It is obvious that many changes may be made in the form, shape and size of the parts, whereby the device may be adapted to aeroplanes of different construction.

In the drawings, similar characters of reference indicate corresponding parts in all the figures, and in which—

Figure 1 is an end view of a biplane with my invention attached thereto and in operative relation with the balancing planes at each end of the main planes; Fig. 2 is a vertical sectional view on the line 2—2 of Fig 1; Fig. 3 is a horizontal sectional view through the valves, showing the pendulum in cross-section and the means of construction between the pendulum and the sliding valve plates, and Fig. 4 is an elevation partly in section showing the application of my invention to an aeroplane.

The flying machine to which I have applied my invention comprises upper and lower horizontal main planes 1 and 2, with pivoted side balancing planes 3 and 4, the whole being held together by a suitable framework made up of horizontal and vertical members 5 and 6.

Referring more particularly to Fig. 4 (which represents the balancing device shown in reduction in Fig. 1), I provide a framework comprising members 7 and 8 with a transverse part 9, the whole being attached to the frame of the aeroplane by means of members 10 and 11. Pivotally supported from the center of the member 9 (which is in the central vertical plane of the aeroplane), is a pendulum 12, provided with a weight 13 having a swinging movement in the opening 14 of the transverse frame member 15, which extends between the inclined members 7 and 8 and is attached thereto.

Adjacent the top of the machine and balanced with respect thereto, is an air-tight cylinder 16, having a piston 17 with oppositely-extending rods 18 and 19 connected thereto. Each end member of the cylinder is provided with an opening through which one of the rods extends, and each opening is provided with a stuffing box 20 or 21, whereby leakage is prevented. The free outer end of each of these rods is secured to a continuous cord or wire 22, which extends around the frame, and at opposite points 23 and 24 is in engagement with the side balancing planes 3 and 4. Suitable pulleys 25, 26, 27 and 28 are provided in order to change the direction of motion of the wire 22. It is obvious that movement of the piston in either direction will result in movement of the balancing planes in opposite directions, which is the result desired, whereby the balancing or change in the direction of flight of the machine is secured. The planes may be brought back to normal by suitably located springs 85.

The coöperating means between the pendulum and the cylinder and piston, is a pair of valves 29 and 30, carried by the cross member 15 of the frame. Each of these valves (Fig. 3) consists of a lower recessed block 31, provided with two transverse openings 32 and 33, into each of which a tube 34, 35 is tightly engaged. The tubes 34 communicate with the atmosphere and the tubes 35 pass on to any suitable tank (not shown), which offers a supply of compressed air or gas. It is to be noted that the recesses in each of the lower blocks is not the same width throughout the length of the block, but adjacent the ends thereof it is narrowed whereby shoulders 36 and 37 result. Each of these blocks is provided with a top cover piece 38 or 39, provided with openings into which the tubes 40 and 41 are secured, the openings in each lower block 31 and top cover-piece 38 registering. Each pair of tubes 40 and 41 are secured to the cylinder 16, adjacent each end thereof. Slidably secured in the recess in each of the blocks 31, is a plate 42 provided with an opening 43, which opening is adapted to register with the openings 32 and 33 into which the tubes 34 and 35 extend, depending on the position of the plate which is determined by the swinging pendulum in one instance and by the spring 44 in the other. Each of the plates is provided with a narrow extending portion 45 adjacent one end of the block 31, whereby shoulders 46 and 47 are formed, these shoulders being in engagement with the shoulders 36 and 37 in the block 31 when the pendulum is hanging vertically, the spring 44 insuring this position. When in this position, the openings 43 in the plate register with the openings 32 in the block and cover piece, whereby the portions of the cylinder 16 on each side of the piston 17 are in communication with the atmosphere. The plate 42 when in the opposite position of end of travel, is shown in the right side of Fig. 3; the opening 43 in the plate is now registering with the openings in the block and cover piece to which the tubes 35 and 41 are secured, thereby placing that portion of the cylinder 16 to the right of the piston 17 in communication with the source of compressed air or gas.

The free inner end of each of the plates 42 is provided with a slot of a length depending on the desired arc of swing of the pendulum 12, a pin 48 carried by the pendulum entering these slots 49, 50. Figs. 3 and 4 show the pendulum to the left of the central vertical axis of the machine in which position the pin 48 therein has carried the right plate 42 to the left position, by reason of the engagement of the pin 48 with the end portion 51 of this plate. It is obvious that if the pendulum is moved back to its central position, the right plate 42 will also move to its left position by reason of the spring 44 acting thereon. When the pendulum is in its central vertical position, each of the plates is in its position within the block and the pin 48 carried by the pendulum is in contact with the end parts 51 and 52 of the plates 42.

When the machine is in flight and in its normal position, the pendulum 12 is hanging vertically and the interior of the cylinder 16 on both sides of the piston 17 is in communication with the atmosphere. The side balancing planes 3 and 4 are horizontal and the piston 17 occupies a central position. If the left side of the machine should tip down from any cause, the pendulum would hang to the left of the central vertical axis of the machine. In this position (Fig. 4), the right valve plate 42 would be moved to the left against the tension of the spring 44 and the portion of the cylinder to the right of the piston would be in communication with the supply of compressed air through the tubes 35 and 41. The portion of the cylinder to the left of the piston will remain in communication with the atmosphere through the tubes 34 and 40, since the plate 42 of the left valve is not disturbed. Air being admitted to the right portion of the cylinder, the piston 17 will be forced to the left, thereby bringing the side, planes 3 and 4 into the position shown in Fig. 4. When these planes have been moved sufficiently to bring the machine back to normal or horizontal position, the pendulum will take its position in the central vertical plane of the machine and the right valve plate will be drawn to the right by the spring 44, thereby placing the portion of the cylinder to the right of the piston in communication with the atmosphere. The excess pressure in the right portion of the cylinder will fall and the movable planes will come back to their normal horizontal position. Should the machine subsequently tip to the right, the same procedure would be gone through but by the left valve in this instance.

In turning an aeroplane when in flight, it is desirable to tip the machine slightly toward the side in which the turn is to be made, and my balancing device described above may also be used for this purpose. If the aviator wishes to turn to the right, he may swing the pendulum to the left, thus opening the right valve to the flow of fluid pressure with the consequent tilting of the machine to the right because of the raising of the plane 4 and the lowering of the plane 3 by the movement of the piston 17 to the left.

From the above, it will be seen that I have provided a balancing means of few parts, which is simple and effective in operation and one that will automatically keep the aeroplane in a balanced horizontal position.

What I claim as my invention and desire to secure by Letters Patent is:

1. A balancing means for an aeroplane having pivoted balancing planes at each side thereof, comprising a cylinder having a piston therein and rods extending from each side of the piston and through the ends of the cylinder, means connecting the said extending ends of the said rods, the said means being in engagement with the said pivoted balancing planes; a pair of tubes extending from one end of the cylinder, a pair of tubes extending from the other end of the cylinder, a recessed block provided with a cover member carried at each side of the said aeroplane, each block being in engagement with each pair of tubes, a slidable plate provided with an opening carried by each recessed block, a pendulum, the inner ends of each of the said sliding plates being provided with an aperture in engagement with a pin carried by the said pendulum whereby as the pendulum swings in either direction, either of the said sliding plates will be moved, thereby placing either end of the said cylinder in communication with the atmosphere or in communication with the source of pressure, whereby the piston will be moved and with it the pivoted planes, whereby the areoplane may be balanced.

2. A balancing means for an aeroplane having pivoted balancing planes at each side thereof, comprising a cylinder having a piston therein and rods extending from the piston and through opposite ends of the said cylinder, helical springs carried by the said rods within the cylinder, the cylinder being provided with a plurality of tubes extending therefrom at each end thereof, a plurality of blocks carried by the said aeroplane, one of the blocks being in engagement with the tubes extending from each end of the said cylinder, a movable member contained within the block and provided with an opening, a source of pressure connected to one of the said tubes, another of the said tubes communicating with the atmosphere, means whereby the said sliding plate may be normally held with the opening therein in communication with the tube opening into the atmosphere, a pendulum, and means whereby the said sliding plate may be moved so that the opening therein may register with the tube communicating with the source of pressure whereby this pressure may be applied to one side of the said piston, the said springs carried within the said cylinder on the said rods bringing the piston back to a central position when the valve has been operated to remove the aforesaid pressure from the cylinder.

3. In a balancing means for an aeroplane having pivoted balancing planes at each side thereof, a pair of blocks provided with a recessed portion having a plate slidable therein, each of the said plates containing an opening adapted to register with either one of a plurality of tubes, one of the said tubes being in communication with the atmosphere and the other communicating with the source of pressure, a pendulum, and means whereby as the pendulum is swung the said opening in each of the said movable plates may be brought into register with either of the said tubes.

4. In a balancing means for an aeroplane having pivoted balancing planes at each side thereof, a pair of blocks at each side of the said aeroplane, one block in each of the said pair being provided with a longitudinally extending recessed portion, a plate slidably mounted within each recessed portion, a plurality of tubes secured to each of the blocks of each of the pairs, the tubes extending from one of the blocks of each pair communicating with one end of a suitable cylinder, one of the other tubes leading from each of the other blocks of each pair communicating with the atmosphere, the remaining tube extending from the said block, each pair communicating with a suitable pressure tank, each of the said plates being provided with an opening therein adapted to register with either of the said pipes in the blocks, a pendulum carried by the frame of the areoplane and midway of the said pairs of blocks, each of the said plates being in engagement with the said pendulum by means of a pin and slot connection whereby as the pendulum is swung in one direction one of the said blocks may be moved, the other remaining stationary, and when the pendulum is swung in the opposite direction the other plate may be moved, the first plate remaining stationary, and means comprising a spring for holding each of the said plates in position when the pendulum lies in a central plane.

5. In a balancing means for an aeroplane having pivoted balancing planes at each side thereof, a pair of blocks provided with a recessed portion having plates slidable therein, each of the said plates containing an opening adapted to register with any one of a plurality of tubes, one of the said tubes being in communication with the atmosphere and the other communicating with a source of pressure, a pendulum, a pin carried by the pendulum, each of the said plates being provided with a longitudinally extending slot through which the said pin extends, springs engaging each of the said plates for holding them in position within the blocks, movement of the pendulum in one direction moving one of the plates, and movement of the pendulum in the other direction moving the other of the said plates, the springs returning the moved plate to normal position when the pendulum is lying in a central plane with the pin therein in engagement with adjacent ends of the slots in the said plates.

In testimony whereof I have signed my name to this specification in the presence of two subscribing witnesses.

HAROLD FOSTER PARKER.

Witnesses:
  MABEL I. OLIVER,
  FRED. W. BURLEIGH.